United States Patent [19]
Hayashi et al.

[11] Patent Number: 4,718,089
[45] Date of Patent: Jan. 5, 1988

[54] METHOD AND APPARATUS FOR DETECTING OBJECTS BASED UPON COLOR SIGNAL SEPARATION

[75] Inventors: Masahiko Hayashi, Toyonaka; Yasuo Fujii, Sakai; Shigeaki Okuyama, Kawachi-nagano, all of Japan

[73] Assignee: Kubota, Ltd., Osaka, Japan

[21] Appl. No.: 16,498

[22] Filed: Feb. 17, 1987

Related U.S. Application Data

[63] Continuation of Ser. No. 661,991, Oct. 18, 1984, abandoned.

[30] Foreign Application Priority Data

Dec. 8, 1983 [JP] Japan ............................. 58-231948

[51] Int. Cl.[4] .......................... G06K 9/00; H04N 9/75
[52] U.S. Cl. ........................................ 382/17; 358/22; 358/101
[58] Field of Search ................ 358/22, 21 R, 80, 101; 382/17

[56] References Cited

U.S. PATENT DOCUMENTS

| 3,706,851 | 12/1972 | Froehlich et al. | 358/183 |
|---|---|---|---|
| 4,015,366 | 4/1977 | Hall, III | 358/108 |
| 4,051,520 | 9/1977 | Davidse et al. | 358/22 |
| 4,189,744 | 2/1980 | Stern | 358/80 |
| 4,268,866 | 5/1981 | Rodgers, III | 358/228 |
| 4,292,649 | 9/1981 | Macheboeuf | 358/22 |
| 4,427,996 | 1/1984 | Tamura | 358/228 |
| 4,506,289 | 3/1985 | Shirakami | 358/22 |
| 4,515,275 | 5/1985 | Mills et al. | 358/106 |
| 4,547,897 | 10/1985 | Peterson | 358/22 |
| 4,602,286 | 7/1986 | Kellar et al. | 358/22 |
| 4,636,847 | 1/1987 | Magi et al. | 358/101 |

FOREIGN PATENT DOCUMENTS 44120 4/1977 Japan ................................. 358/22

Primary Examiner—John W. Shepperd
Attorney, Agent, or Firm—Edwin E. Greigg

[57] ABSTRACT

A chroma keying generator apparatus is disclosed having a monitor camera transmitting color signals to multipliers for separating a luminance signal from an image signal and amplifying same by selected gain levels, comparison circuits for comparing two color signals with pre-selected reference levels therefor having upper and lower limits and producing outputs denoting that the ratio of the color signal to the luminance signal for a given color falls within a pre-selected reference range, and a gate circuit which evaluates the outputs from the comparison circuits to produce pulses representing a logical "1" when the output is within the reference range and a logical "0" when the output is not within the reference range.

12 Claims, 6 Drawing Figures

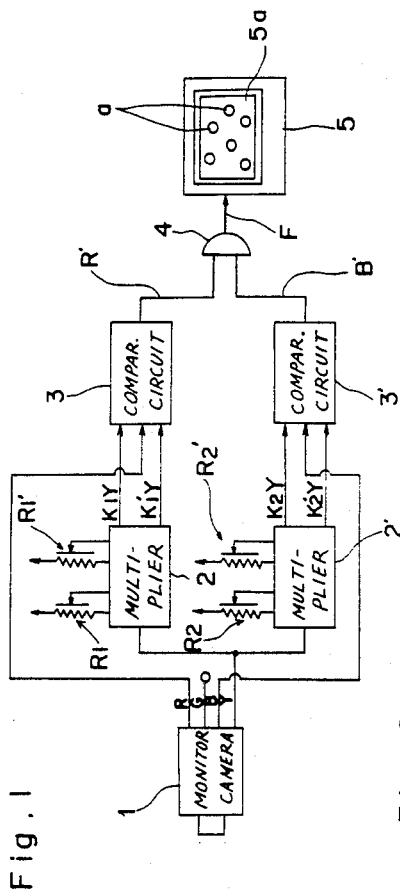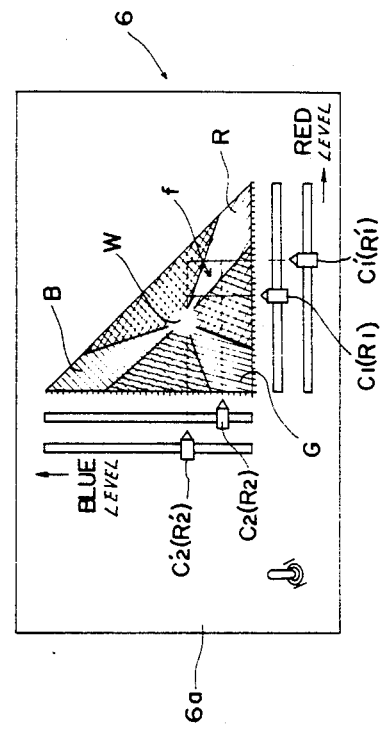

METHOD AND APPARATUS FOR DETECTING OBJECTS BASED UPON COLOR SIGNAL SEPARATION

This is a continuation of copending application Ser. No. 661,991 filed Oct. 18, 1984, now abandoned.

BACKGROUND OF THE INVENTION

This invention relates to a color signal separating apparatus and especially to a color signal separating apparatus for separating and digitizing signals corresponding only to particular colors from image signals provided by a monitor camera thereby to obtain signals corresponding to the particular colors. More particularly, the invention relates to an apparatus suited for use with a fruit harvesting machine as means to exclude the sky, leaves and the like which lie in the background of fruit from image signals provided by a monitor camera acting as means to detect positions of fruit to be harvested.

In one known type of color signal separating apparatus, the monitor camera for picking up the image of an object includes an optical filter for passing particular colors only, in order to obtain signals corresponding to the particular colors from image signals from the monitor camera. Another type of known apparatus carries out logical processing to obtain a sum of or a difference between color signals corresponding to particular colors among a plurality of color signals output by a color video camera.

In order to digitize the color signals, the color signals are first stored in a frame memory or the like and are thereafter put to digital logical processing. Such a process requires a complicated construction and the logical processing is time-consuming. Where the optical filter is employed, it is necessary to have available many kinds of filter corresponding to particular colors to be determined.

Futhermore, both of the known apparatus noted above have the serious disadvantage that the image signals obtained under conditions where brightness or luminance levels deviate from a certain value cannot be differentiated without greatly complicating software therefor. Especially, it is impossible to maintain the brightness to a certain level where the apparatus is used with the above-noted fruit harvesting machine which operates outdoors. On the other hand, the particualr colors to be sampled have a certain range, further complicating the process with the known construction, and simple improvements in hardware are inadequate to permit the image signals to be processed on real time basis.

SUMMARY OF THE INVENTION

This invention has been made having regard to the above state of the art, and its object is to provide a color signal separating apparatus capable of obtaining digital signals corresponding to particular colors on real time basis and regardless of luminance levels.

In order to achieve this object, the color signal separating apparatus according to this invention comprises chief features based on the following principle:

A certain color $\vec{F}$ may be expressed by a vector represented by the following equation (i):

$$\vec{F} = a\vec{R} + b\vec{G} + c\vec{B} \quad \ldots \ldots (1) \tag{i}$$

wherein a, b and c are coefficients, and $\vec{R}$, $\vec{G}$ and $\vec{B}$ correspond to the vectors of the three primary colors of light.

Therefore, particular colors are determinable by determining the coefficients a, b and c, but the color $\vec{F}$ cannot be determined without obtaining definite brightness since each of the coefficients include a brightness (luminance level) parameter.

Image information input means comprising a monitor camera such as a color video camera normally is adapted to output a luminance signal Y and signals R, G and B of the three primary colors separately. The signals Y, R, G and B have the relationship represented by the following equations (ii)-(v):

$$R/Y = K1 \tag{ii}$$

$$B/Y = K2 \tag{iii}$$

$$G/Y = K3 \tag{iv}$$

$$Y = R + G + B = 1 \tag{v}$$

Thus, the certain color $\vec{F}$ is normalized and determined regardless of brightness by determining the luminance level Y and the parameters of any two of the gains K1 to K3.

More particularly, where, for example, a particular color $\vec{F}$ which is red or redish is to be picked out, a digital signal corresponding to the particular color $\vec{F}$ is obtained by a simple logical processing by predetermining K1 and K2 in the above equations (ii) and (iii) utilizing the luminance signal Y, the red color signal R and the blue color signal B.

The principle of this invention is also applicable where the red signal R, the green signal G and the blue signal B are available, for a sum in intensity of these signals R, G and B equals an intensity of the luminance signal Y. That is to say the principle of this invention is applicable if any three of the four signals are made available.

The divisions as equations (ii) and (iii) deteriorate processing precision because it is difficult to process actual signals in broad band. In order to avoid this disadvantage this invention modifies the above equations (ii) and (iii) into multiplications and the data are processed by multipliers which carry out the following equations (ii') and (iii'). Thus, the invention is capable of selecting particular colors on real time basis without requiring a memory for storing the signals prior to the processing.

$$R = K1Y \tag{ii'}$$

$$B = K2Y \tag{iii'}$$

In order to carry out the above signal processing, the apparatus according to this invention comprises multipliers for amplifying a luminance signal separated from the image signals by selected gains, comparison circuits for comparing color signals with upper limits and lower limits corresponding to separating levels output by the multipliers and digitizing the color signals, and a gate circuit for carrying out a logical operation on digitized color signals provided by the comparison circuits, the signals corresponding to the particular colors being output by the gate circuit.

The features set out above produce the following excellent effects: digitized signals corresponding to particular color are obtained with high precision on real time basis and regardless of brightness, only by setting ratios of the luminance signal and the color signals to values corresponding to the particular colors. Furthermore, the sampling color may be selected as desired only by changing the ratios.

Since the range of the color to be selected may be determined as desired by the range of gains by which the luminance signal is multiplied, not only one particular color but signals including a certain range of color may be digitized. This is a very important advantage when digitizing a color such as of fruit which has a certain range.

It will be noted from the above description that the signal processing system employed in the apparatus of the invention is essentially less likely to be affected by the variation in luminance.

However, undesired effects of the variation in luminance are not necessarily eliminated perfectly. An error caused by fluctuation of the pedestal level of the luminance and color signals will probably occur in case where said signals are generated as outputs from electronic circuits having a structure of an alternative connection.

Accordingly, one of the preferred embodiments of the invention is adapted to previously process the luminance and color signals respectively by means of DC restoration circuit prior to the processing of said signals in multipliers or other circuits. In these DC restoration circuits, output signals from sample hold circuits are subtracted respectively from the input signals such as the luminance signal so as to eliminate the adverse influence of the pedestal level fluctuation whereby the input signals are converted into DC signals having intensities based on a ground level, i.e. an absolute 0 (zero) volt. The preferred embodiment can therefore provide an extremely exact detection of objects such as fruits because said undesired influence of the luminance fluctuation is perfectly eliminated. Frame memories are necessary to store the thus processed signals in the preferred embodiments.

BRIEF DESCRIPTION OF THE DRAWINGS

Several embodiments of this invention will hereinafter be described with reference to the drawings, in which:

FIG. 1 is a block diagram showing a color signal separating apparatus according to a principal embodiment of the invention, FIG. 2 is a schematic view of a control panel used in the above embodiment.

DETAILED DESCRIPTION OF THE PREFERRED EMBODIMENTS

Figure 3:
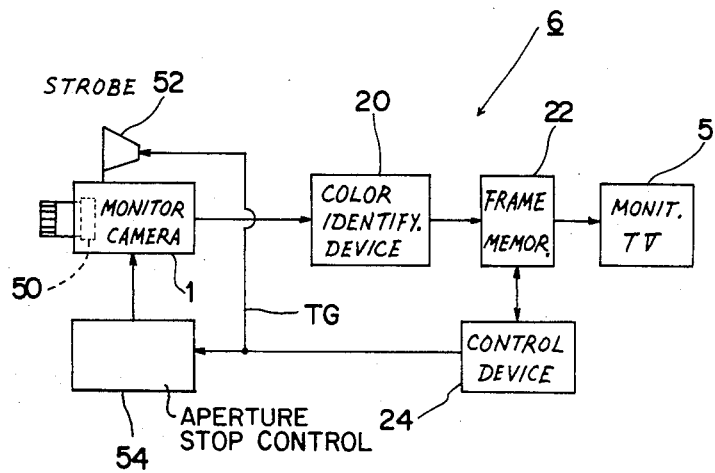
FIG. 3 is a block diagram of the above apparatus where a light emitting device and an automatic shutter speed adjusting device are additionally provided.

Referring to FIG. 1, a monitor camera 1 comprising a color video camera detects a fruit tree A and its picture information in the form of luminance signal Y is input to multipliers 2 and 2'. These multipliers 2 and 2' multiply the luminance signal Y by gains K1, K1', K2 and K2' set by potentiometers R1, R1' and R2 and R2', respectively. Resulting values are input to comparison circuits 3 and 3' as reference levels K1Y, K1'Y, and K2Y and K2'Y respectively. The comparison circuit 3 selects and digitizes red color signals R between upper limit reference level K1Y and lower limit reference level K1'Y, and the comparison circuit 3' selects and binarizes blue color signals B between upper limit reference levek K2Y and lower limit reference level K2'Y. A gate 4 obtains a logical AND of binary color signal R' and B' output from the comparison circuits 3 and 3'. Thus the gate 4 outputs only those particular colors f, in the form of particular binary color signals F, corresponding to fruit a laying within the range determined by using the gains K1, K1', K2 and K2', and an image responsive to the binary signals corresponding only to the fruit a is displayed on a screen 5a of a monitor television 5.

In order to facilitate determination of the particular colors to be differentiated, the color signal separating apparatus according to this embodiment comprises a control panel 6a having control knobs C1, C1', C2 and C2' arranged two dimensionally thereon for controlling the potentiometers R1, R1', R2 and R2', respectively. More particularly, as shown in FIG. 2, the control knobs C1 and C1' for controlling the potentiometers R1 and R1'to determine digitized levels of the red color signals R are one above the other to be movable in horizontal directions, whereas the control knobs C2 and C2' for controlling the potentiometers R2 and R2' to determine digitized levels of the blue color signals B are arranged side by side to be movable in vertical directions. The panel 6a provides, above, the control knobs C1 and C1' and at a righthand side of the control knobs C2 and C2' a color display which shades off in accordance with positions of the control knobs C1, C1', C2 and C2', that is to say the aforesaid gains K1, K1', K2 and K2'. Thus it enables the operator to recognize by intuition that the colors to be digitized are in the range f defined by extension lines from the four control knobs.

The portion having a triangular shape in FIG. 2 is colored such that green shades off into red in the righthand direction and into blue in the upward direction, whereby the range of digitized color signals is readily perceptible.

It is to be noted that reference R, B and G in FIG. 2 indicate ranges of the three primary colors, red, blue and green, and that reference W indicates a range of white.

Figure 5:
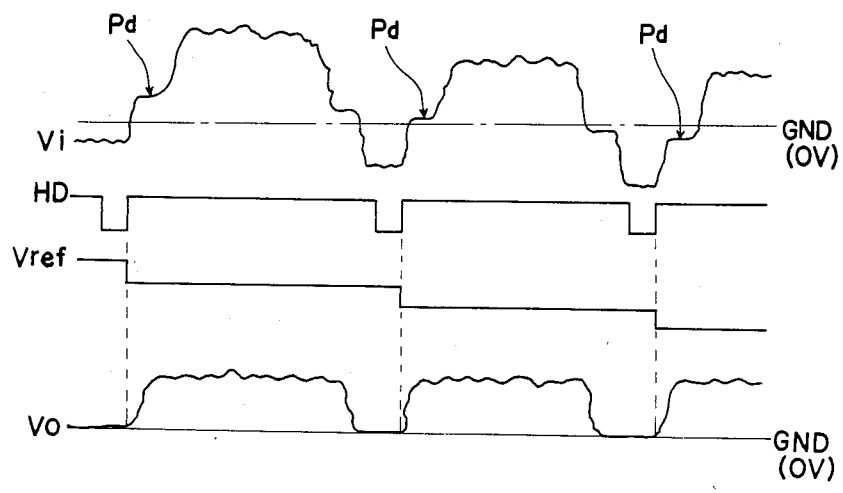
FIG. 5 is a time chart showing operation of the signal modifying means.
Figure 4:
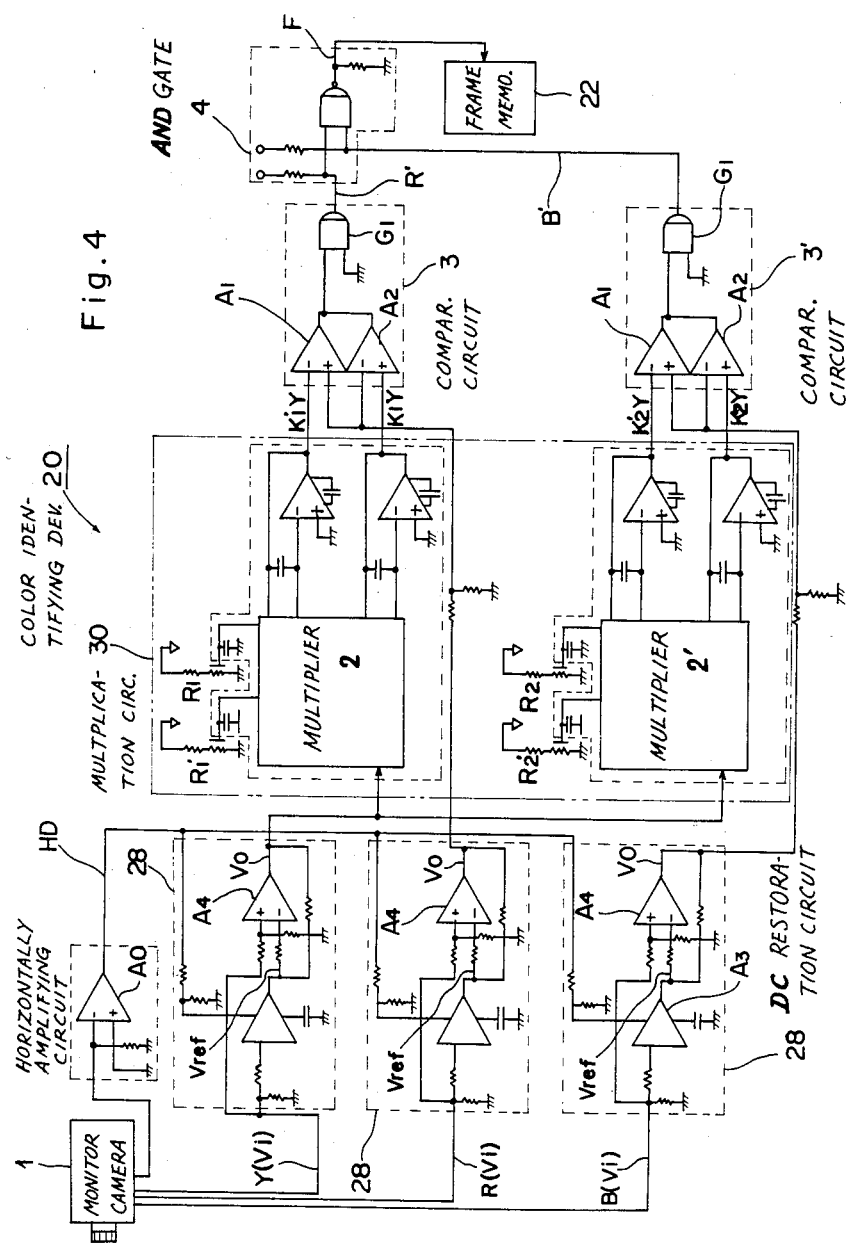
FIG. 4 is a circuit diagram of the above embodiment where signal modifying means are additionally provided.

Another embodiment is shown in FIGS. 3 to 5.

In this embodiment, color picture signals for one frame provided by the monitor camera 1 having the above construction are converted by a color identifying device 20 into digital signals corresponding only to the fruit, and the digital signals are stored in a frame memory 22. At the same time the results are displayed on a monitor television 5 and a control device 24 carries out fruit position detection and other processing, whereby the apparatus is capable of automatically discriminating fruit from other objects.

Referring to FIG. 4 showing details of the color identifying device 20, the pictorial information or luminance signal Y provided by the monitor camera 1 is fed through one of DC restoration circuits 28 to be described later to a multiplication circuit 30 having two multipliers 2 and 2'.

At the multiplication circuit 30 the luminance signal Y is multiplied by the gains K1, K1', K2 and K2' set by potentiometers R1, R1', R2 and R2', respectively, and is thereafter input to comparison circuits 3 and 3'. The values thus obtained are utilized as the reference levels K1Y, K1'Y, K2Y and K2'Y for digitizing the red color signals R and the blue color signals B.

The red and blue color signals R and B output together with the luminance signal Y by the monitor camera 1 are also fed to the comparison circuits 3 and 3'. Each of these comparison circuits 3 and 3' constitutes a window comparator having two comparators A1 and A2 and a reverse buffer G1. The color signals R and B lying between their respective upper limits K1Y and K2Y and their respective lower limits K1'Y and K2'Y of the reference levels are selected and digitized. The AND gate 4 obtains a logical AND of the resulting digital signals R' and B', and the frame memory 22 receives the particular digital color signals F corresponding only to the fruit lying in the range determined by the potentiometers R1, R1', R2 and R2'.

The monitor camera 1 outputs the luminance signal Y, the red color signals R and the blue color signals B in AC coupling, and therefore these signals have an inconstant pedestal level Pd. The DC restoration circuits 28 are provided to control the pedestal level Pd to be an absolute ground level (GND level, OV). Each of the DC restoration circuits 28 comprises a sample-hold circuit A3 to sample-hold an input signal Vi in synchronism with rises HD of a horizontal synchronization signal input from a horizontal amplifiers Ao, as shown in FIG. 5, a differential amplifier A4 to obtain a difference between the input signal Vi and an output signal Vref of the sample-hold circuit A3. In other words, the DC restoration circuit 28 is adapted to convert the input signal Vi into a DC component signal Vo from the absolute ground level.

According to the embodiment shown in FIGS. 3 to 5, the luminance signal Y and the color signals R and B are processed at the DC restoration circuits 28 prior to input to the multiplication circuit 30 and the comparison circuits 3 and 3'. Therefore, the color signals are separated with high precision even if there are variations in the brightness of fruit under measurement.

An automatic stop control system may be added to the structure shown in FIGS. 3 to 5 in order to eliminate more perfectly the influence of the luminance fruits or other objects to be detected.

Figure 6:
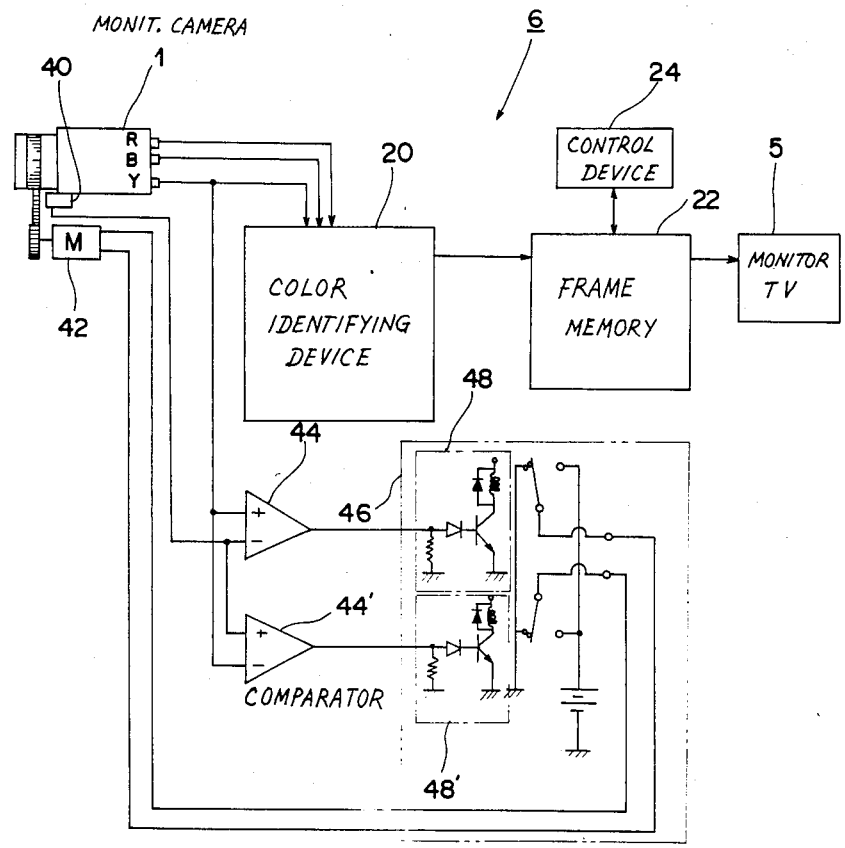
FIG. 6 is a circuit diagram showing an automatic camera stop adjusting device.

In FIG. 6 reference number 40 denotes a stop encoder operatively connected to a stop of the camera and reference number 42 denotes a motor for adjusting an opening degree of the stop. Signals from the encoder 40 are input to two comparators 44 and 44', while the luminance signals Y from the monitor camera 1 are also input to these comparators 44 and 44'. Output signals from the comparators 44, 44' are input to a motor drive circuit including switch circuits 48 and 48'. When the switch circuit 48 is energized, for example, the motor 42 is put to forward rotation, and when the switch circuit 48' is energized, the motor 42 is put to reverse rotation. Thus the opening degree of the stop is automatically adjusted in accordance with variations of the luminance signals Y.

It is of course possible to incorporate the construction of FIG. 6 into the apparatus of FIGS. 1 and 2.

What is claimed is:

1. An object detecting system for detecting an article of produce ripened to a desired degree comprising, a monitor camera for detecting the object and providing a composite image signal including color component signals and a luminance signal to a reception means, said reception means being adapted to discriminate from among said color component signals and to select that color component signal corresponding to a particular color of the article of produce desired to be harvested and further to product a digital image of said article of produce having the particular color, a first multiplier (2) for receiving the luminance signal (Y), multiplying the luminance signal by a first gain (K1) and a second gain (K1'), and outputting resulting values as a first and a second multiplication signals (K1*Y, K1'*Y), a second multiplier (2') for receiving the luminance signal (Y), multiplying the luminance signal by a third gain (K2) and a fourth gain (K2'), and outputting resulting values as a third and fourth multiplication signals (K2*Y, K2'*Y), gain setting means including first, second, third, and fourth control means (C1, C1', C2, C2') for setting the first, second, third and fourth gains, respectively, the first and second gains being set so that the first and second multiplication signals correspond to upper and lower limits of a first color component (R) of the article of produce to be harvested, the third and fourth gains being set so that the third and fourth multiplication signals correspond to upper and lower limits of a second color component (B) of the article of produce harvested, a first comparator (3) for receiving the first color component signal from the monitor camera and for receiving the first and second multiplication signals as threshold values from the first multiplier and further for outputting a first digital signal determined by whether the first color component signal is in a range having the first multiplication signal as an upper limit and the second multiplication signal as a lower limit, a second comparator (3') for receiving the second color component signal from the monitor camera and the third and fourth multiplication signals as threshold values from the second multiplier, and further for outputting a second digital signal determined by whether the second color component signal is in a range having the third multiplication signal as an upper limit and the fourth multiplication signal as a lower limit, a gate circuit (4) for carrying out an AND operation on the first and second digital signals and producing an output signal, a frame memory (5) for receiving the output signal of the gate circuit as a digital image signal (F) and storing a digital image of the article of produce, the first, second, third, and fourth control means being associated with a color-coded control panel (6a) for movement thereon along X-Y axes thereof, one pair of said control means serving to define X-axes limits of said gains and another pair of said control means serving to define Y-axis limits of said gains, the X-axis and Y-axis limits thus serving to define a section (f) of the control panel having a color substantially corresponding to said particular color of the article of produce stored in the frame memory as the digital image.

2. A object detecting system as claimed in claim 1, wherein the first and second control means (C1, C1') are arranged on a panel (6a) one above the other and movable in horizontal directions, and the third and fourth control means (C2, C2') are arranged on the panel (6a) side by side and movable in vertical directions.

3. An object detecting system as claimed in claim 2, further comprising adjusting means for automatically adjusting an opening degree of a stop of the monitor camera in response to variations in the luminance signal (Y).

4. An object detecting system as claimed in claim 3, wherein the adjusting means includes a motor for driving the stop, a stop encoder operatively connected to the stop, a comparator circuit for receiving a signal from the stop encoder and the luminance signal from the monitor camera, and a circuit for outputting a drive signal to the motor in response to a signal received from the comparator circuit.

5. A object detecting system as claimed in claim 1, further comprising at least one DC restoration circuit for converting each of the luminance signal and the color signals into DC component signals from an absolute ground level prior to input to the multipliers and comparators.

6. A method for detecting a position of an object by receiving an image signal comprising color component signals and a luminance signal from a monitor camera which detects the object, discriminating color component signals corresponding to a particular color of the object from other color component signals to output a digital signal, and producing an image of the object, comprising the steps of:

receiving a luminance signal (Y) from a monitor camera, multiplying the luminance signal by a first gain (K1) and a second gain (K1'), and forming resulting values as first and second multiplication signals (K1*Y, K1'*Y), receiving a luminance signal (Y) from a monitor camera, multiplying the luminance signal by a third gain (K2) and a fourth gain (K2'), and forming resulting values as third and fourth multiplication signals (K2*Y, K2'*Y), setting gain means including first, second, third, and fourth control means (C1, C1', C2, C2') for setting first, second, third and fourth gains, respectively, setting the first and second gains so that the first and second multiplication signals correspond to upper and lower limits of a first color component (R) of the object, setting the third and fourth gains so that the third and fourth multiplication signals correspond to upper and lower limits of a second color component (B) of the object, supplying the first color component signal from the monitor camera and supplying the first and second multiplication signals as threshold values from the first multiplier to a first comparator (3), evaluating whether the first color component is in a range having the first multiplication signal as an upper limit and the second multiplication signal as a lower limit and then forming a first digital signal therefrom, supplying the second color component signal from the monitor camera and supplying the third and fourth multiplication signals as threshold values from the second multiplier to a second comparator (3'), evaluating whether the second color component signal is in a range having the third multiplication signal as an upper limit and the fourth multiplication signal as a lower limit and forming a second digital signal therefrom, carrying out an AND operation on the first and second digital signals by use of a gate circuit (4) and producing an output signal, receiving the output signal of the gate circuit as a digital image signal (F) of a frame memory (5) and storing a digital image of the object, whereby the position of the object can be determined by using the frame memory.

7. A method as claimed in claim 6, which comprises arranging the first and second control means (C1, C1') on a panel (6a) one above the other and movable in horizontal directions, and arranging the third and fourth control means (C2, C2') on the panel (6a) side by side and movable in vertical directions.

8. A method as claimed in claim 7, which comprises coloring portions of the panel (6a) such that a section (f) of the panel determined by positions of the first to fourth control means has a color substantially corresponding to the color of the object desired to be detected.

9. A method as claimed in claim 6, which comprises converting each of the luminance signal and the color signals into DC component signals from an absolute ground level prior to their input to the multipliers and comparators by use of at least one DC restoration circuit.

10. A method for detecting and harvesting an article of produce ripened to a desired state and possessing a particular color hue comprising, detecting the object by use of a monitor camera and directing a composite image signal including color component signals and a luminance signal to a reception means, operating said reception means to discriminate from among said color component signals and selecting that color component signal corresponding to a particular color of the article of produce desired to be harvested to create a digital image of said article of produce having the particular color, using a first multiplier (2) for receiving a luminance signal (Y), multiplying the luminance signal by a first gain (K1) and a second gain (K1'), and forming resulting values as first and second multiplication signals (K1*Y, K1'*Y), using a second multiplier (2') for receiving a luminance signal (Y), multiplying the luminance signal by a third gain (K2) and a fourth gain (K2'), and forming resulting values as third and fourth multiplication signals (K2*Y, K2'*Y), using a gain setting means including first, second, third, and fourth control means (C1, C1', C2, C2') for setting the first, second, third and fourth gains, respectively, the first and second gains being set so that the first and second multiplication signals correspond to upper and lower limits of a first color component (R) of the article of produce to be harvested, setting the third and fourth gains so that the third and fourth multiplication signals correspond to upper and lower limits of a second color component (B) of the article of produce to be harvested, using a first comparator (3) for receiving a first color component signal from the monitor camera and receiving the first and second multiplication signals as threshold values from the first multiplier and forming a first digital signal determining whether the first color component signal is in a range having the first multiplication signal as an upper limit and the second multiplciation signal as a lower limit, using a second comparator (3') for receiving a second color component signal from the monitor camera and the third and fourth multiplication signals as threshold values from the second multiplier, and forming a second digital signal determined by whether the second color component signal in in a range having the third multiplication signal as an upper limit and the fourth multiplication signal as a lower limit, using a gate circuit (4) for carrying out an AND operation on the first and second digital signals and producing an output signal, using a frame memory (5) for receiving the output signal of the gate circuit as a digital image signal (F) and storing a digital image of the article of produce, arranging the first, second, third, and fourth control means on a color-coded control panel (6a) for movement thereon along X-Y axes thereof, defining X-axis limits of said gains by use of one pair of said control means, defining Y-axis limits of said gains by use of another pair of said control means, setting the X-axis and Y-axis limits to define a section (f) of the control panel having a color substantially corresponding to said particular color of the article of produce stored in the frame memory as the digital image, whereby the position of an article of produce can be determined and supplied to external harvesting means.

11. A method as claimed in claim 10, which comprises using an adjusting means for automatically adjusting an opening degree of a stop of the monitor camera in response to variations in the luminance signal (Y).

12. A method as claimed in claim 11, which comprises using an adjusting means including a motor for driving a stop, a stop encoder operatively connected to the stop, a comparator circuit for receiving a signal from the stop encoder and the luminance signal from the monitor camera, and using a circuit for forming a drive signal to the motor in response to a signal received from the comparator circuit.

* * * * *